United States Patent [19]

Sugihara

[11] Patent Number: 4,930,118
[45] Date of Patent: May 29, 1990

[54] FRAME-INTERVAL FAULT DETECTION IN A DEMAND ASSIGNMENT TDMA COMMUNICATION SYSTEM

[75] Inventor: Shigeru Sugihara, Tokyo, Japan

[73] Assignee: NEC Corporation, Tokyo, Japan

[21] Appl. No.: 277,734

[22] Filed: Nov. 30, 1988

[30] Foreign Application Priority Data

Nov. 30, 1987 [JP] Japan .................. 62-302574

[51] Int. Cl.⁵ .................. H04J 3/02; H04J 3/14
[52] U.S. Cl. .................. 370/16; 370/13.1; 370/97
[58] Field of Search .................. 370/16, 13, 14, 96, 370/97; 371/22

[56] References Cited

U.S. PATENT DOCUMENTS

| | | | |
|---|---|---|---|
| 4,059,736 | 11/1977 | Perucca et al. .................. | 370/16 |
| 4,442,518 | 4/1984 | Morimoto .................. | 370/16 |
| 4,597,079 | 6/1986 | Aoki et al. .................. | 370/16 |

FOREIGN PATENT DOCUMENTS 61-281729 12/1986 Japan .

Primary Examiner—Douglas W. Olms
Assistant Examiner—Min Jung
Attorney, Agent, or Firm—Sughrue, Mion, Zinn, Macpeak & Seas

[57] ABSTRACT

In a demand assignment TDMA communication system, a central station transmits a frame sync and a polling signal at periodic intervals to terminal stations to elicit a response therefrom. Each terminal station transmits a test signal in response to reception of the frame sync. The central station or a repeater station detects the strength of the test signals received by a regular-channel receiver and a spare-channel receiver and determines if each of the receivers is operating normally or abnormally. The response received by the regular-channel receiver is supplied to a utilization circuit when this receiver is determined as operating normally and the response received by the spare-channel receiver is supplied instead to the utilization circuit when the regular-channel receiver is determined as operating abnormally while the spare-channel receiver is determined as operating normally.

8 Claims, 4 Drawing Sheets

REPEATER STATION 2

FRAME-INTERVAL FAULT DETECTION IN A DEMAND ASSIGNMENT TDMA COMMUNICATION SYSTEM

BACKGROUND OF THE INVENTION

The present invention relates generally to demand assignment time division multiple access (TDMA) communication systems, and more specifically to the detection of a fault in a central station receive channel of a demand assignment TDMA communication system.

In a demand assignment TDMA communication system, a central station periodically transmits a polling signal to elicit a response from each of a plurality of geometrically scattered terminal stations. If there is a packet to transmit, each of the polled terminal stations transmits it on an assigned channel, or time slot, to the central station. If required, a repeater station is provided to relay signals between remote terminal stations and the central station. As shown and described in Japanese Provisional Patent Specification (Tokkaisho) 61-281729, a prior art demand assignment TDMA communication system employs a fault detection scheme in which the central station utilizes the response from the polled station as an indication of an operating condition of its receive channels to effect switching from a regular receive channel to a spare receive channel if a faulty condition is detected in the regular channel. The repeater station employs the same fault detection scheme to provide channel switching. However, the response from a remote terminal station occurs once for every N frames, where N usually corresponds to the number of maximum terminal stations that can be accommodated in the TDMA system. Thus, if a trouble should develop in the repeater station, the prior art fault detection system is not capable of detecting it until the remote station is polled next time which is N frames later than the time of occurrence of the trouble, and hence the downtime of the repeater station can be as long as N frame intervals. The amount of this loss time could be substantial to the TDMA system because of its capability for carrying high density information. A similar situation occurs in the central station of a demand assignment TDMA system in which the number of terminal stations registered, or actually operating in the system is much smaller than the system capacity since no response is returned during frames which are assigned to nonregistered terminal stations.

SUMMARY OF THE INVENTION

It is therefore an object of the present invention to significantly reduce the downtime of a repeater station and/or a central station of a demand assignment TDMA communication system in the event of a fault in one of duplicated receive channels of the repeater station and/or central station.

This object is obtained by having all the terminal stations simultaneously transmit a test signal in the form of a burst in response to receipt of a frame sync from the central station or from the repeater station and by monitoring the transmitted bursts at the central station and/or repeater station to detect a fault in their duplicated receive channels.

Specifically, the present invention provides a demand assignment time division multiple access communication system having a central station and a plurality of terminal stations. The central station transmits a frame sync and a polling signal at periodic intervals to the terminal stations to elicit a response therefrom. Each of the terminal stations transmits a test signal in response to reception of the frame sync from the central station. The central station comprises a regular-channel receiver and a spare-channel receiver for respectively establishing regular and spare channels to the terminal stations for receiving the response and the test signal. A fault detection circuit at the central station detects the strength of the test signals received by the regular-channel receiver and the spare-channel receiver and determines therefrom whether each of the regular-channel and spare-channel receivers is operating normally or abnormally. A switch is provided for exclusively supplying the response received by the regular-channel receiver to a utilization circuit when the regular-channel receiver is determined as operating normally and exclusively supplying the response received by the spare-channel receiver to the utilization circuit when the regular-channel receiver is determined as operating abnormally while the spare-channel receiver is determined as operating normally.

The repeater station includes a regular-channel receiver and a spare-channel receiver for receiving the response and the test signal from the associated remote terminal station. A fault detection circuit is also provided for detecting the strength of the test signals received through its regular-channel receiver and spare-channel receiver to determine whether each of its regular-channel and spare-channel receivers is operating normally or abnormally. A response received by its regular-channel receiver is transmitted to the central station when it is determined as operating normally and a response received by its spare-channel receiver is transmitted to the central station when its regular-channel receiver is determined as operating abnormally while its spare-channel receiver is determined as operating normally.

BRIEF DESCRIPTION OF THE DRAWINGS

The present invention will be described in further detail with reference to the accompanying drawings, in which.

DETAILED DESCRIPTION

Figure 1:
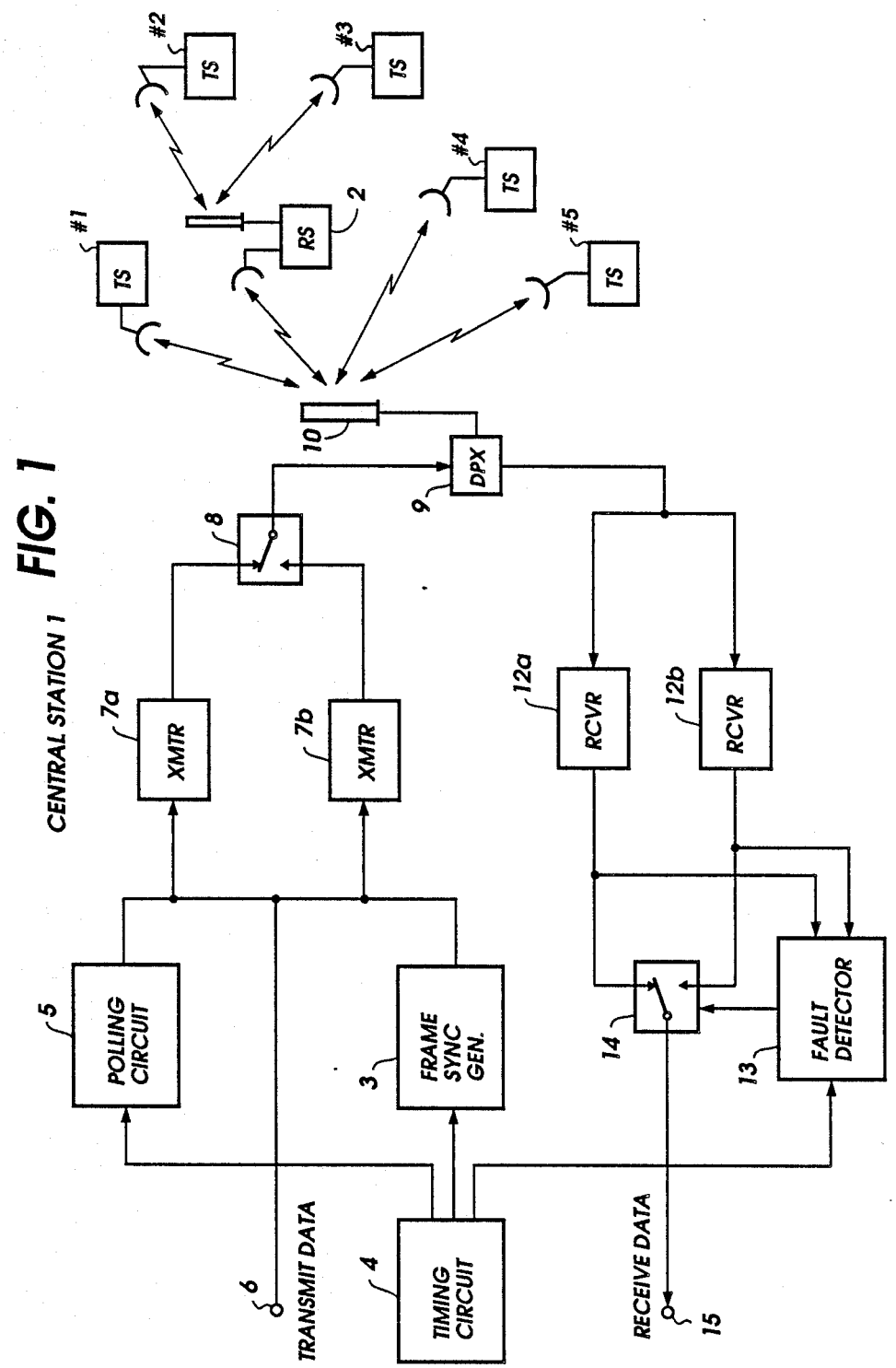
FIG. 1 is a block diagram of a central station of a TDMA communication system of the present invention.

Referring now to FIG. 1, there is shown a time division multiple access (TDMA) demand assignment communication system according to a preferred embodiment of the present invention. The system generally comprises a central station 1 and a plurality of geometrically scattered terminal stations #1 through #5, for example, of which the terminal stations #1, #4 and #5 are in direct communication with the central station 1 and the terminal stations #2 and #3 are in communication with it via a repeater station 2. Central station 1 includes a frame sync generator 3 which generates a frame sync in response to a frame timing signal supplied from a timing circuit 4. A polling circuit 5 is provided to respond to a poll timing signal from the timing circuit 4 by generating a polling signal at frame intervals to sequentially poll each of the terminal stations #1 through #5 to elicit a response therefrom.

The operation of the system begins with the transmission of a polling signal from the central station 1 to sequentially cause each station to transmit a station identifier, a destination address (DA) and a data packet. Data packets from the polled stations are recovered by the central station at an output terminal 15 and subsequently appear at an input terminal 6 after being processed through appropriate processing circuitry, or utilization circuit, not shown,.

The frame sync and the polling signal are therefore multiplexed with transmit data from terminal 6 to form a time division multiplexed (TDM) data frame by inserting a source address (SA) and a destination address (DA) into each frame (FIG. 4) and supplied to transmitters 7a and 7b of regular-channel and spare-channel systems where the multiplexed signals are modulated upon a carrier and delivered to a switch 8. The output of the regular-channel transmitter 7a is supplied by switch 8 to an antenna 10 via a duplexer 9 and transmitted to all the terminal stations.

If the system can accommodate a maximum of N terminal stations, typically 128, for example, each of the terminal stations #1 to #5 will be polled once for every N frames and there is a substantial number of polling signals having the station identifiers of nonregistered terminal stations which will be accommodated in the future. Therefore, it is assumed that L frames contain polling signals directed to registered stations and M frame contain polling signals directed to nonregistered stations, where L+M=N. The present invention is suitable for such a communication system in which the number of terminal stations registered in the system is much smaller than the maximum capacity of the system.

As will be described later, each terminal station detects the frame sync contained in each of the N successive frames and examines the station address contained in the polling field of each frame and transmits a data packet if there is one to transmit together with a test signal which is in the form of a burst. Other terminal stations also send a test signal in response to the detection of a frame sync regardless of whether there is no packet to transmit or whether the station address contained in the polling field does not match the own station identifier.

A packet from terminal stations #1, #4 and #5 or from the repeater station 2 is received by antenna 10 at central station 1 and passed through duplexer 9 to a regular-channel receiver 12a as well as to a spare-channel receiver 12b, in each of which the packet is demodulated to a baseband signal. Timing circuit 4 further generates a sampling pulse in coincidence with the reception of test signals from the terminal stations which is delayed by an interval "Td" from the occurrence of each frame sync. This sampling pulse is applied to a fault detector 13 to enable it to sample test signals from the outputs of receivers 12a and 12b. The outputs of receivers 12a and 12b are connected to a switch 14 which normally couples the output of regular-channel receiver 12a to terminal 15.

Figure 2:
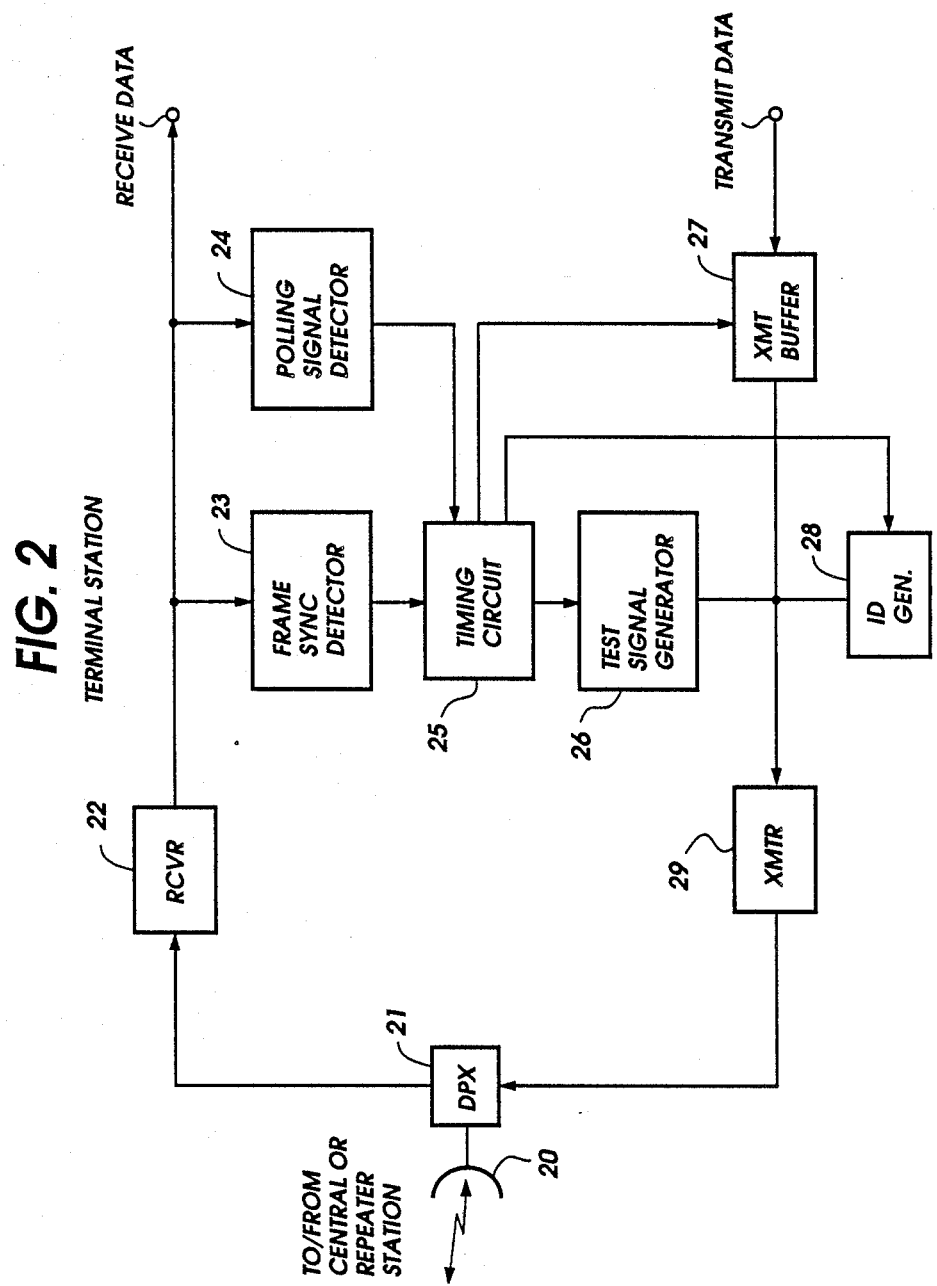
FIG. 2 is a block diagram of each of the terminal stations of FIG. 1.

As shown in FIG. 2, the N-frame TDM data stream from the central station 1 is received directly by antenna 20 at each of the terminal stations #1, #4 and #5 and applied through duplexer 21 to a receiver 22 where the signal is demodulated into the original baseband signal. The TDM data stream from the central station 1 is also relayed by the repeater station 2 in a manner as will be described to terminal stations #2 and 190 3.

Figure 4:
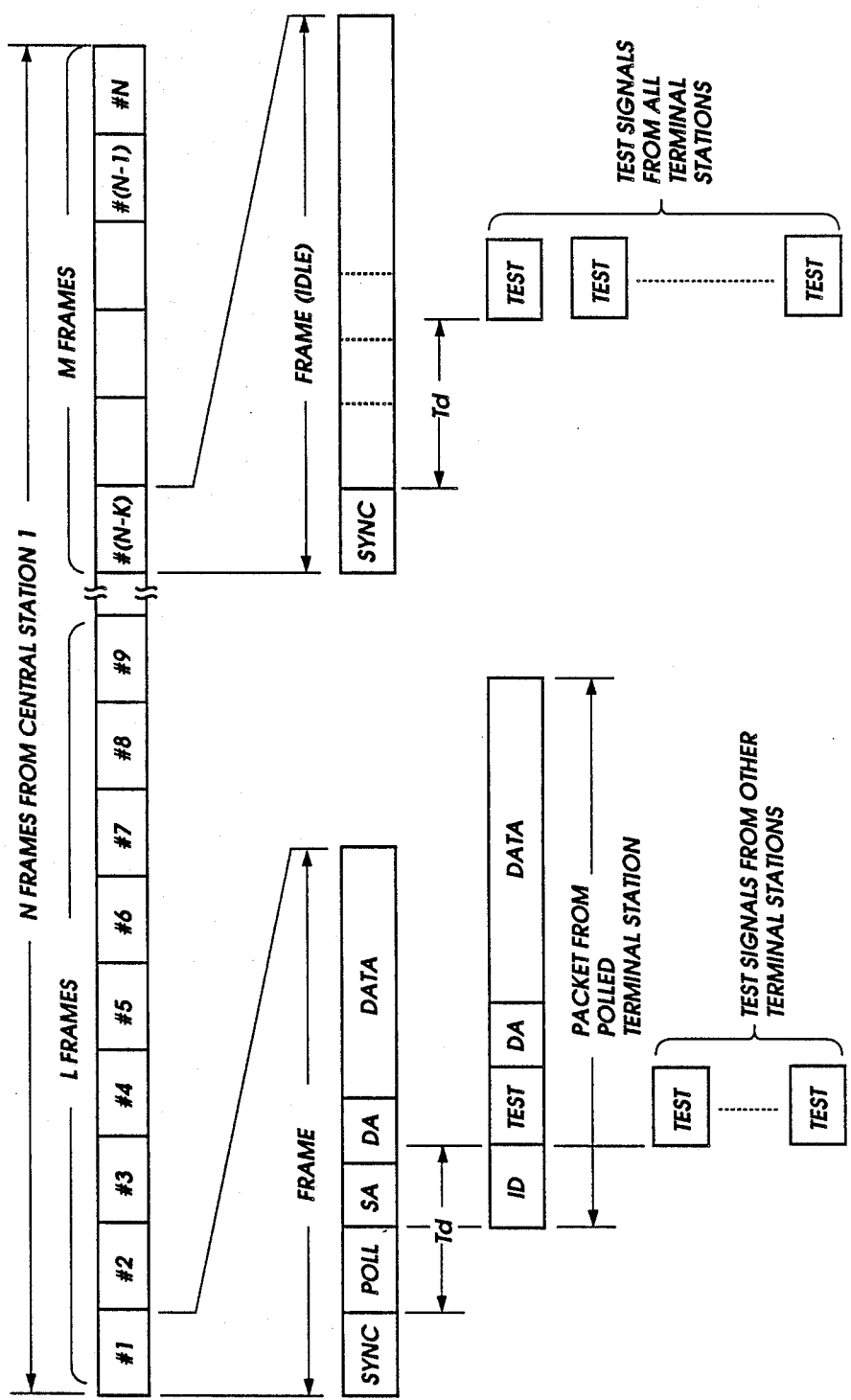
FIG. 4 is a timing diagram useful for describing the operation of the present invention.

Each of the terminal stations #1 to #5 includes a frame sync detector 23 to detect the frame sync and supplies an output to a timing circuit 25. A polling signal detector 24 is connected to the receiver 22 to examine the polling field of each frame to determine whether the station identifier contained therein coincides with the identifier of the own station. If there is a match between them, polling signal detector 26 supplies an output to the timing circuit 25 which applies an enable pulse at appropriate timing to an identifier generator 28 to allow it to forward the station identifier (ID) of the terminal station to a transmitter 29 (see FIG. 4). Timing circuit 25 then supplies an enable pulse to a test signal generator 26 at the end of a delay time Td following the detection of the frame sync to cause it supply a test signal to the transmitter 29 subsequent to the station identifier. Timing circuit 25 further supplies an enable pulse to a transmit buffer 27. If a destination address (DA) and data have already been stored in the buffer 27, they are forwarded to the transmitter 29. Thus, a packet as shown in FIG. 4 is modulated upon a carrier by the transmitter 29 and sent through duplexer 21 and antenna 20 to the central station 1 or repeater station 2. It is seen therefore that all of the terminal stations simultaneously transmit a test signal at frame intervals regardless of whether they are polled or not and the test signals transmitted from the terminal stations #1, #4 and #5 are detected by the central station 1 and those transmitted from the terminal stations #2 and #3 are detected by the repeater station 2 as will be described hereinbelow.

Figure 3:
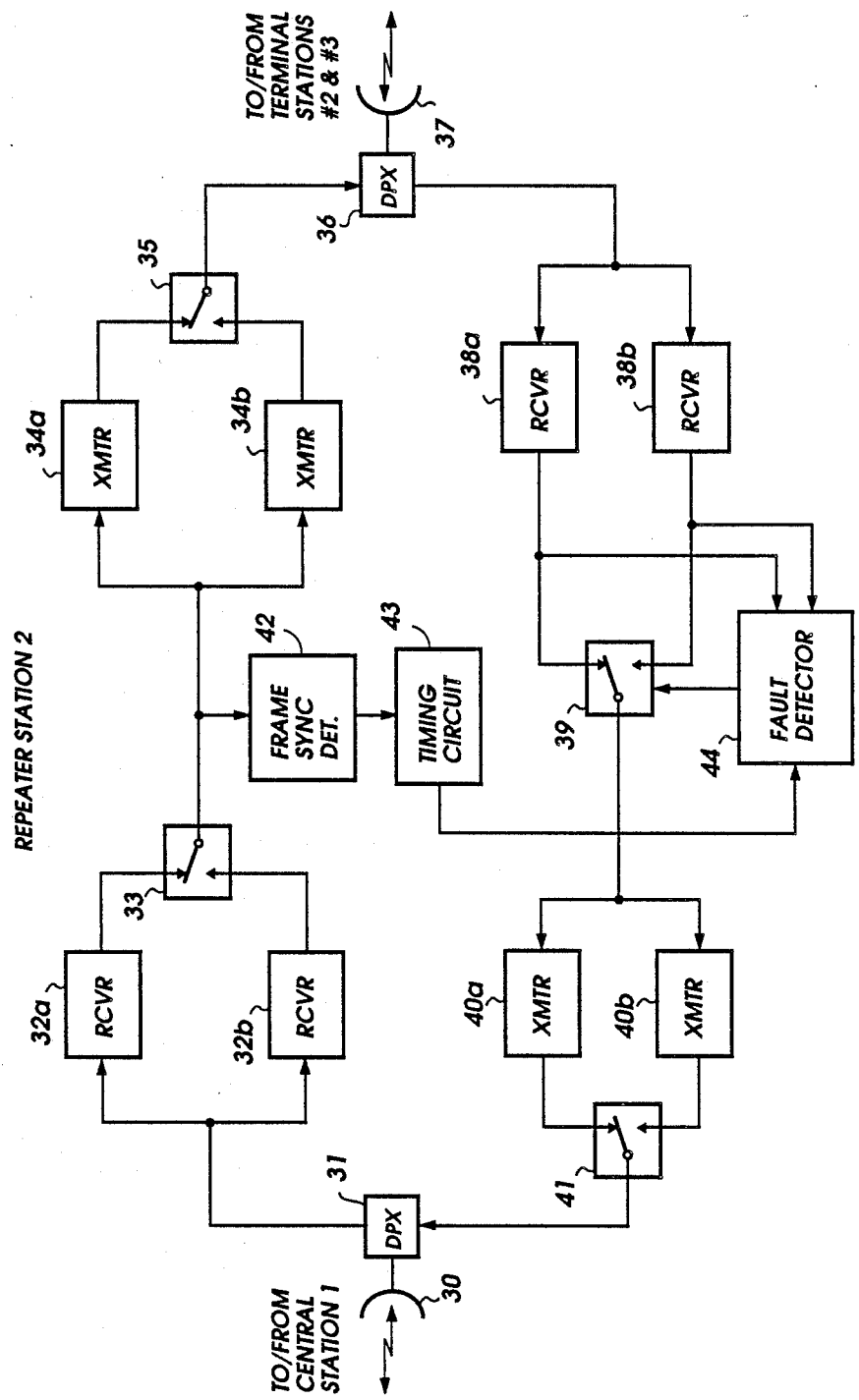
FIG. 3 is a block diagram of the repeater station of FIG. 1.

Details of the repeater station 2 are shown in FIG. 3. The TDM signal from the central station 1 is detected by antenna 30 and supplied through duplexer 31 to a regular-channel receiver 32a and a spare-channel receivers 32b, the output of regular-channel receiver 32a being coupled by a switch 33 to regular-channel and spare-channel transmitters 34a and 34b. The output of regular-channel transmitter 34a is coupled by a switch 35 to antenna 37 through duplexer 36 for relaying the received TDM signal to terminal stations #2 and #3.

A packet from each of the terminal stations #2 and #3 is received by antenna 37 and passed through duplexer 36 to a regular-channel receiver 38a and a spare-channel receiver 38b whose outputs are coupled to a switch 39 which normally couples the output of regular-channel receiver 38a to the inputs of regular- and spare-channel transmitters 40a and 40b. The outputs of transmitters 40a, 40b are connected to a switch 41 which normally couples the output of regular-channel transmitter 40a to the duplexer 31.

A frame sync detector 42 is connected to the output of switch 33 to detect a frame sync from the central station 1 and supplies an output to a timing circuit 43 which, in turn, generates a sampling pulse that is time coincident with test signals from the terminal stations #2 and #3. This sampling pulse is applied to a fault detector 44 to enable it to detect the test signals recovered by the receivers 38a and 38b. Fault detector 44 is of identical construction to the fault detector 13 of central station 1. As will be described, the switch 39 is controlled by the fault detector 44 to switch the output of spare-channel receiver 38b to the transmitter 40a, 40b when the regular-channel receiver 38a should fail.

Since all the terminal stations simultaneously transmit a test signal at frame intervals, the central station 1 receives test signals from terminal stations #1, #4 and

5 at frame intervals and the repeater station 2 also receives test signals from terminal stations #2 and #3 at frame intervals. Fault detector 13 at central station 1 determines whether the total energy of the test signals from terminal stations #1, #4 and #5 is higher or lower than a prescribed energy level which represents an abnormal condition of each of the receivers 12a and 12b. If the total energy of test signals from terminal stations #1, #4 and #5 is higher than the prescribed level, the receivers 12a and 12b are considered to be operating properly and the switch 14 is allowed to remain in the normal position coupling the output of the regular-channel receiver 12a to the output terminal 15. When the total energy of the test signals from the regular-channel receiver 12a falls below the prescribed level, while the total energy of test signals from the spare-channel receiver 12b is higher than the prescribed level, the receiver 12a is considered to be operating abnormally and the fault detector 13 supplies a switching control signal to switch 14 to couple the output of demultiplexer 13b to the output terminal 15. If both of the total energy of test signals from the regular-channel channel and the total energy of test signals from the spare-channel channel simultaneously fall below the prescribed level, the fault detector 13 makes a logical decision that both receivers 12a and 12b are not operating abnormally and the switch 14 remains in the normal position.

Likewise, fault detector 44 at repeater station 2 determines whether the total energy of the test signals from terminal stations #2 and #3 is higher or lower than a prescribed energy level which represents an abnormal condition of each of the receivers 38a and 38b. If the total energy of test signals from terminal stations #2 and #3 is higher than the prescribed level, the receivers 38a and 38b are considered to be operating properly and the switch 39 is allowed to remain in the normal position coupling the output of the regular-channel channel to the transmitters 40a and 40b. When the total energy of the test signals from the regular-channel receiver 38a falls below the prescribed level, while the total energy of test signals passing through the spare-channel receiver 38b is higher than the prescribed level, the receiver 38a is considered to be operating abnormally and the fault detector 44 supplies a switching control signal to switch 39 to couple the output of receiver 38b to the transmitters 40a, 40b. If both of the total energy of test signals from the regular-channel channel and the total energy of test signals from the spare-channel channel simultaneously fall below the prescribed level, the fault detector 44 makes a logical decision that both receivers 38a and 38b are not operating abnormally and the switch 39 remains in the normal position.

Therefore, the downtime of a receiver of the up-direction (a direction from terminal stations to the central station) route of a demand assigned TDMA system can be reduced to one frame interval. To ensure reliability of the logical decision of the fault detectors 13 and 44, each fault detector may include a counter for counting several frames in which abnormality is detected. If abnormality prevails for several frames, the counter will produce an output to operate the associated switch. While such count operation may increase the downtime, it is still much smaller than the downtime of the prior art fault detection system.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A demand assignment time division multiple access communication system having a central station and a plurality of terminal stations, said central station transmitting a frame sync and a polling signal at periodic intervals to said terminal stations to elicit a response therefrom, each of said terminal stations transmitting a test signal in response to reception of said frame sync from the central station, said central station comprising:

regular-channel receive means and spare-channel receive means for respectively establishing regular and spare channels to said terminal stations for receiving said test signal and an information signal as said elicited response;

fault detection means for detecting the strength of said test signals received by said regular-channel receive means and said spare-channel receive means and determining therefrom whether each of said regular-channel and spare-channel receive means is operating normally or abnormally; and switch means for exclusively supplying said information signal received by said regular-channel receive means to utilization means when said regular-channel receive means is determined as operating normally, and exclusively supplying said information signal received by said spare-channel receive means to said utilization means when said regular-channel receive means is determined as operating abnormally while said spare-channel receive means is determined as operating normally.

2. A demand assignment time division multiple access communication system as claimed in claim 1, wherein said central station recyclically transmits L frames each containing said frame sync, said polling signal and an information signal and M frames each containing said frame sync, said polling signal and none of said information signals, where the total of said L and M frames correspond to a maximum number of said terminal stations which can be accommodated by said system.

3. A demand assignment time division multiple access communication system as claimed in claim 1, further comprising a repeater station and a remote terminal station which is identical to said terminal stations, said repeater station relaying said frame sync and said polling signal from said central station to said remote terminal station, said repeater station comprising:

second regular-channel receive means and second spare-channel receive means for receiving said information signal and said test signal from said remote terminal station;

second fault detection means for detecting the strength of said test signals received by said second regular-channel receive means and said second spare-channel receive means and determining therefrom whether each of said second regular-channel receive means and said second spare-channel receive means is operating normally or abnormally; and transmit means for exclusively transmitting said response received by said second regular-channel receive means to said central station when said second regular-channel receive means is determined as operating normally and exclusively supplying said response received by said second spare-channel receive means to said central station when said second regular-channel receive means is determined as operating abnormally while said second spare-channel receive means is determined as operating normally.

4. A demand assignment time division multiple access communication system having a central station and a plurality of terminal stations, said central station comprising:
  transmit means for generating a frame sync and a polling signal at periodic intervals to sequentially elicit a response from each of said terminal stations and transmitting a time division multiplexed (TDM) signal containing said frame sync, said polling signal and an information signal;
  regular-channel receive means and spare-channel receive means for receiving signals from each of said terminal stations;
  switch means having a first position for exclusively connecting the output of said regular-channel receive means to utilization means and a second position for exclusively connecting the output of said spare-channel receive means to said utilization means; and
  fault detection means for detecting the strength of a test signal at the outputs of both of said regular-channel receive means and said spare-channel receive means and determining therefrom whether said regular-channel receive means is operating normally or abnormally and causing said switch means to switch from said first position to said second position when said regular-channel receive means is determined as operating abnormally while said spare-channel receive means is determined as operating normally, each of said terminal stations comprising:
  means for receiving said TDM signal from said central station;
  means for detecting said frame sync containing in said received TDM signal and for transmitting said test signal upon detection of said frame sync; and
  means for detecting a coincidence between said polling signal contained in said received TDM signal and a station identifier uniquely assigned to each of said terminal stations and transmitting said response upon detection of said coincidence.

5. A demand assignment time division multiple access communication system as claimed in claim 4, wherein said TDM signal comprises L+M frames, each of said L frames containing said frame sync, said polling signal and said information signal and each of said M frames containing said frame sync, said polling signal and none of said information signals, where the total of said L and M frames correspond to a maximum number of said terminal stations which can be accommodated by said system.

6. A demand assignment time division multiple access communication system as claimed in claim 4, further comprising a repeater station and a remote terminal station which is identical to said terminal stations, said repeater station comprising:
  relay means for relaying said TDM signal to said remote terminal station;
  second regular-channel receive means and second spare-channel receive means for receiving signals from said remote terminal station;
  second transmit means for establishing a radio channel to said central station;
  second switch means having a first position for exclusively connecting the output of said second regular-channel receive means to said second transmit means and a second position for exclusively connecting the output of said second spare-channel receive means to said second transmit means; and
  second fault detection means for detecting the strength of said test signal at the outputs of said second regular-channel receive means and said second spare-channel receive means and determining therefrom whether said second regular-channel receive means is operating normally or abnormally and causing said second switch means to switch from said first position to said second position when said second regular-channel receive means is determined as operating abnormally while said second spare-channel receive means is determined as operating normally.

7. A method for switching between a regular-channel receiver and a spare-channel receiver of a master station, said master station establishing a demand assignment time division multiple access communication channel to each of a plurality of remote stations, the method comprising the steps of:
  (a) transmitting a frame sync and a polling signal at periodic intervals from said master station to said remote stations;
  (b) receiving said frame sync and said polling signal at each of said remote stations;
  (c) transmitting a test signal to said master station from each of said remote stations upon reception of said frame sync;
  (d) detecting a coincidence between said received polling signal and a station identifier uniquely assigned to each of said remote stations and transmitting an information signal to said master station upon detection of said coincidence;
  (e) detecting the strength of said test signals at the outputs of said regular-channel receiver and said spare-channel receiver and determining therefrom whether each of said regular-channel receiver and said spare-channel receiver is operating normally or abnormally; and
  (f) utilizing exclusively said information signal received by said regular-channel receiver when the same is determined as operating normally and utilizing exclusively said information signal received by said spare-channel receiver when said regular-channel receiver is determined as operating abnormally while said spare-channel receiver is determined as operating normally.

8. A method for switching between a regular-channel receiver and a spare-channel receiver of a master station, said master station establishing a demand assignment time division multiple access communication channel to each of a plurality of remote stations, the method comprising the steps of:
  (a) generating a frame sync and a polling signal at periodic intervals and transmitting a time division multiplexed (TDM) signal containing said frame sync and polling signal and a first information signal from said master station to said remote stations;
  (b) receiving said TDM signal at each of said remote stations;
  (c) detecting said frame sync contained in said received TDM signal and transmitting a test signal upon detection of said frame sync to said master station;

(d) detecting a coincidence between said polling signal contained in said received TDM signal and a station identifier uniquely assigned to each of said remote stations and transmitting a second information signal upon detection of said coincidence to said master station;

(e) receiving said second information signal and said test signal by said regular-channel receiver and said spare-channel receiver;

(f) detecting the strength of said test signals at the outputs of said regular-channel receiver and said spare-channel receiver and determining therefrom whether each of said regular-channel receiver and said spare-channel receiver is operating normally or abnormally; and (g) utilizing exclusively said second information signal received by said regular-channel receiver when said regular-channel receiver is determined as operating normally and utilizing exclusively said second information signal received by said spare-channel receiver when said regular-channel receiver is determined as operating abnormally while said spare-channel receiver is determined as operating normally.

* * * * *